(12) United States Patent
Moriya

(10) Patent No.: US 6,760,060 B1
(45) Date of Patent: Jul. 6, 2004

(54) OBSERVATION APPARATUS FOR OBSERVING A DEFECT IN A MOVING TARGET OBJECT USING SCATTERED LIGHT

(75) Inventor: Kazuo Moriya, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 0 days.

(21) Appl. No.: 09/464,191

(22) Filed: Dec. 16, 1999

Related U.S. Application Data

(63) Continuation-in-part of application No. 08/795,741, filed on Feb. 6, 1997, now abandoned.

(30) Foreign Application Priority Data

Feb. 16, 1996 (JP) ................................................ 8-052536

(51) Int. Cl.⁷ .............................. H04N 3/14; H04N 7/18
(52) U.S. Cl. ....................................... 348/126; 348/321
(58) Field of Search .............................. 348/61, 86, 87, 348/92–95, 125, 126, 129–132, 294, 311, 312, 317, 320–322, 323; H04N 7/18, 3/14

(56) References Cited

U.S. PATENT DOCUMENTS

| | | | |
|---|---|---|---|
| 4,741,622 A | | 5/1988 | Suwa et al. .................. 356/401 |
| 4,743,971 A | * | 5/1988 | Hiighi .......................... 348/311 |
| 4,850,275 A | | 7/1989 | Utreja et al. ................ 102/293 |
| 5,155,597 A | * | 10/1992 | Lareau et al. ................ 348/311 |
| 5,329,111 A | * | 7/1994 | Sonoda et al. ............... 348/243 |
| 5,477,265 A | * | 12/1995 | Tani ............................. 348/243 |
| 5,557,407 A | * | 9/1996 | Takamiya .................... 356/499 |
| 5,795,687 A | | 8/1998 | Yasuda ......................... 430/22 |
| 5,815,267 A | * | 9/1998 | Kato ............................. 356/486 |
| 6,411,377 B1 | * | 6/2002 | Noguchi .................. 356/237.4 |

* cited by examiner

Primary Examiner—Ngoc-Yen Vu
(74) Attorney, Agent, or Firm—Kubovcik & Kubovcik

(57) ABSTRACT

An observation apparatus includes a CCD sensor which has, on a light-receiving surface, pixel lines each including a plurality of pixels, sequentially shifts charge signals of the pixels of each line, which are generated upon receiving light, to the adjacent line, and sequentially outputs the charge signals through the line at one end; an illuminating device for illuminating a moving observation target with a laser beam; an imaging device for focusing scattered light from the moving observation target to form an image on the light-receiving surface; and a driving circuit for driving the CCD such that the shift speed of the charge signals matches the moving speed of the image on the light-receiving means. In some cases, the CCD sensor and the driving circuit has a function of shifting the charge signals in a direction perpendicular to the shift direction. The CCD sensor has a shift register for receiving the charge signals of the pixels of the line at one end, shifting the charge signals to sequentially output each charge signal, and a dark current buffer for storing charge signals of a dark current output to the shift register through the line at one end, and outputs contents obtained by subtracting, from contents of the shift register, corresponding contents of the dark current buffer.

6 Claims, 3 Drawing Sheets

OBSERVATION APPARATUS FOR OBSERVING A DEFECT IN A MOVING TARGET OBJECT USING SCATTERED LIGHT

This application is a continuation-in-part of application Ser. No. 08/795,741 filed Feb. 6, 1997 now abandoned.

FIELD OF THE INVENTION

The present invention relates to an apparatus for observing a target object by using scattered light and, more particularly, to an apparatus to which a TDI (Time Delay Integration) method by a CCD sensor is applied.

BACKGROUND OF THE INVENTION

Conventionally, when scattered light from a two-dimensionally moving object or fluid is focused and formed into an image, and the two-dimensional image is converted into an image signal and observed, the image data must be processed by an image processing unit or the like and analyzed because the obtained signal strength is low. Therefore, the observation apparatus becomes bulky, and a long time is required for observation.

In addition, since scattering due to a defect in a semiconductor wafer, or dust or a defect on a wafer is generally very weak, a bulky apparatus and a long observation time are necessary.

SUMMARY OF THE INVENTION

It is an object of the present invention to provide an observation apparatus having a simple arrangement, which can observe a defect of a moving target object or semiconductor wafer by using scattered light in real time with a high sensitivity in accordance with the movement of the target object.

In order to achieve the above object, according to the present invention, there is provided an observation apparatus comprising a CCD sensor which: has, on a light-receiving surface, pixel lines each including a plurality of pixels, sequentially shifts the charge signals of the pixels of each line, each of which is generated and integrated upon receiving light, to the adjacent line, and sequentially outputs the charge signals through the line at one end; illuminating means for illuminating a moving observation target with a laser beam; imaging means for focusing scattered light from the moving observation target to form an image on the light-receiving surface; and driving means for driving the CCD such that the shift speed of the charge signals matches a moving speed of the image on the light-receiving means.

The CCD sensor and the driving means may have a function of shifting the charge signals in the direction perpendicular to the shift direction. In addition, the CCD sensor preferably has a shift register for receiving the charge signals of the pixels of the line at one end, shifting the received charge signals to sequentially output each charge signal, and a dark current buffer for storing charge signals of a dark current output to the shift register through the line at one end, and outputs contents obtained by subtracting, from contents of the shift register, corresponding contents of the dark current buffer.

DETAILED DESCRIPTION OF THE INVENTION

Figure 1:
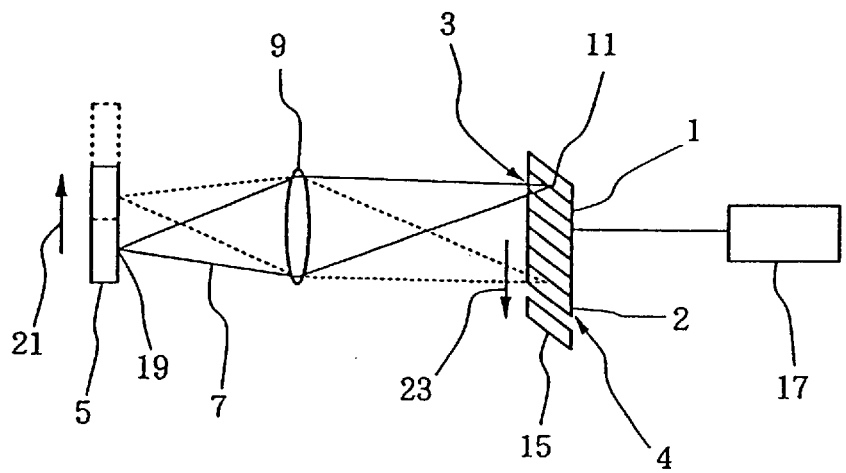
FIG. 1 is a schematic view showing an observation apparatus according to an embodiment of the present invention.

FIG. 1 is a schematic view showing an observation apparatus according to an embodiment of the present invention. As shown in FIG. 1, this apparatus comprises a two-dimensional CCD sensor 4 which: has, on a light-receiving surface 3, pixel lines 1 each including a plurality of pixels, sequentially shifts the charge signals of the pixels of each line 1, which is generated upon receiving light, to the adjacent line, and sequentially outputs the charge signals through the line 2 at one end; an imaging means 9 for focusing scattered light 7 from a moving observation target 5 to form an image on the light-receiving surface 3; a shift register 15 for receiving the charge signals of pixels of the line 2 at one end, shifting the received charge signals to sequentially output each charge signal; and a driving circuit 17 for driving the two-dimensional CCD sensor 4 such that the shift speed of the charge signals matches the moving speed of an image 11 on the light-receiving surface 3. The driving circuit 17 adjusts the shift speed on the basis of the position information of the moving observation target 5.

In this arrangement, the imaging means 9 forms an image on the light-receiving surface 3 of the two-dimensional CCD sensor 4 on the basis of scattered light from the observation target 5. The image 11 corresponding to an observation point 19 on the observation target 5 moves in a direction indicated by an arrow 23 as the observation target 5 moves in a direction indicated by an arrow 21. The driving circuit 17 adjusts the shift speed on the basis of the position information of the observation target thereby matching the shift speed with the moving speed of the image 11 on the two-dimensional CCD sensor 4. Even when the light intensity of the image 11 is low, the intensity is integrated into the shifted charge signals as the image 11 is moving on the light-receiving surface 3, so that the signals output to the shift register 15 have a sufficient intensity. Therefore, an image signal having a sufficient intensity of the still image of the observation target 5 is output from the shift register 15.

Figure 2:
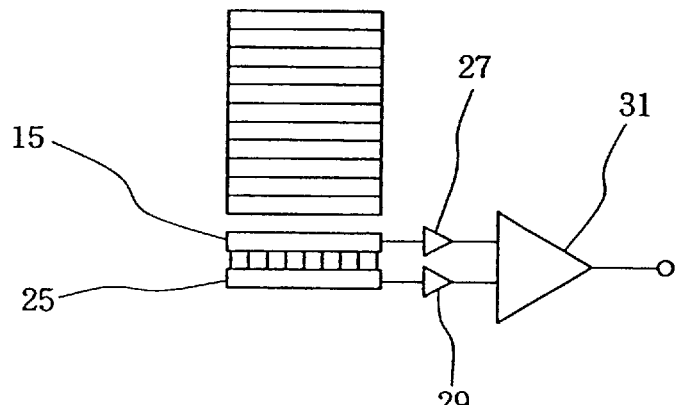
FIG. 2 is a view showing another embodiment of the two-dimensional CCD sensor of the apparatus shown in FIG. 1.

FIG. 2 is another embodiment of the two-dimensional CCD sensor. In FIG. 2, reference numeral 25 denotes a buffer for storing a dark current component for the data of the shift register 15; 27 and 29, amplifiers for amplifying outputs from the shift register 15 and the buffer 25, respectively; and 31, a differential amplifier for outputting the difference between outputs from the amplifiers 27 and 29.

The intensity of the charge signals input to the shift register 15 is integrated, as described above. The background (dark current component) may be nonuniform. In this embodiment, the dark current component is stored in the buffer 25 such that an image signal obtained by subtracting a uniform dark current component is always output. More specifically, the two-dimensional CCD sensor 4 is driven while incident light is shielded. The integrated dark current components of the pixels of the line 2 are output to the buffer 25 through the shift register 15 and stored in the buffer 25. In actual observation, every time the charge signals transferred from the line 2 are sequentially output from the shift register 15 to the differential amplifier 31 through the amplifier 27, the corresponding dark current components of the buffer 25 are sequentially and synchronously output to the differential amplifier 31 through the amplifier 29. With this operation, an image signal exclusive of a constant dark current component is output from the differential amplifier 31.

Figure 3:
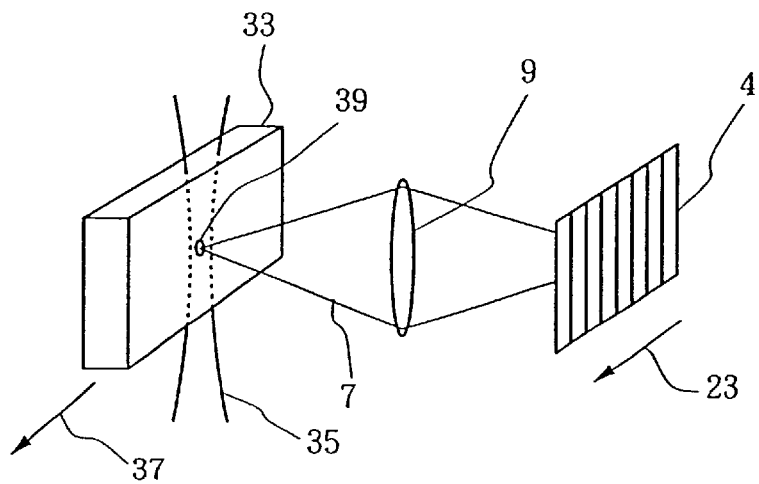
FIG. 3 is a view showing the apparatus in FIG. 1, which is applied to observation of a semiconductor wafer.

FIG. 3 shows the apparatus in FIG. 1, which is applied to observation of a semiconductor wafer. Referring to FIG. 3, reference numeral 33 denotes a semiconductor wafer as an observation target; 35, a laser beam for illuminating the wafer 33; 37, a moving direction of the wafer 33; and 39, a scattering body in the wafer 33. In this case, the laser beam 35 is made incident into the semiconductor wafer 33 through the side surface of the wafer 33 along a direction perpendicular to the moving direction 37 and parallel to the surface of the wafer 33. The scattering body 39 illuminated with the laser beam 35 generates the scattered light 7. The image of the scattering body 39 is formed on the two-dimensional CCD sensor 4 by the scattered light 7.

Figure 4:
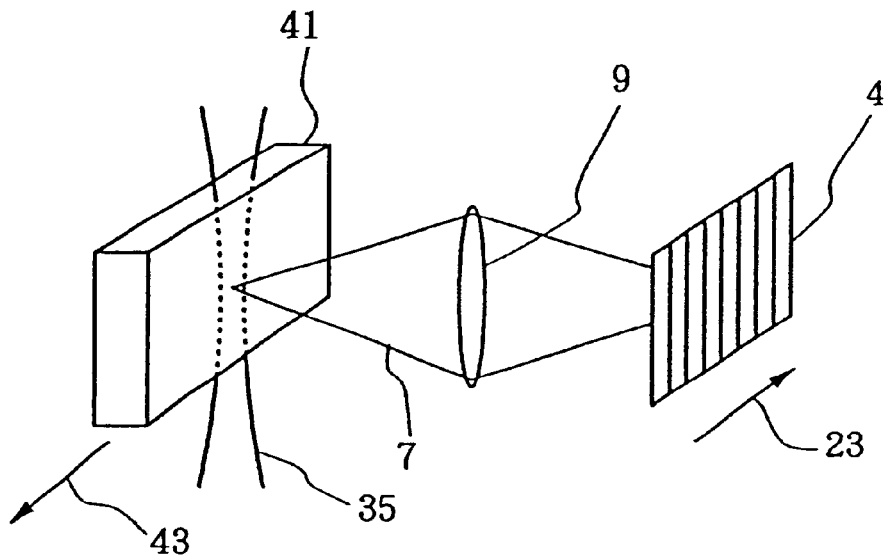
FIG. 4 is a view showing the apparatus in FIG. 1, which is applied to observation of a fluid.

FIG. 4 shows the apparatus in FIG. 1, which is applied to observation of a fluid. Referring to FIG. 4, reference numeral 41 denotes a fluid cell in which a fluid as an observation target flows; 35, the laser beam for illuminating the fluid flowing in the fluid cell 41; and 43, a flowing direction of the fluid. In this case, the laser beam 35 is made incident into the fluid through the side surface of the cell 41 along a direction perpendicular to the direction 43 and parallel to the surface of the cell 41. The fluid illuminated with the laser beam 35 generates the scattered light 7, and the image of the fluid is formed on the two-dimensional CCD sensor 4 by the scattered light 7.

Figure 5:
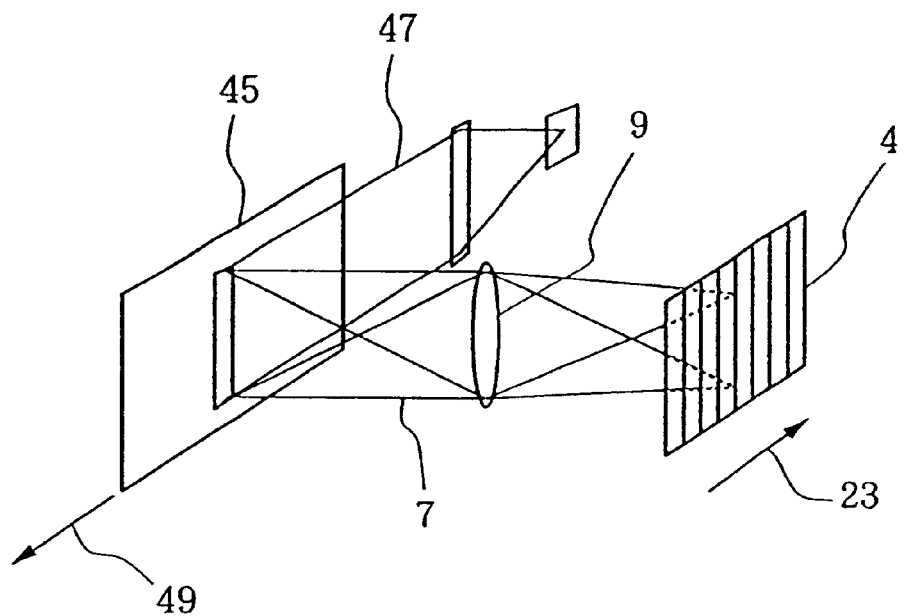
FIG. 5 is a view showing the apparatus in FIG. 1, which is applied to observation of a wafer surface.

FIG. 5 shows the apparatus in FIG. 1, which is applied to observation of a wafer surface. Referring to FIG. 5, reference numeral 45 denotes a wafer surface as an observation target; 47, a band-shaped laser beam for illuminating the wafer surface 45; and 49, a moving direction of the wafer surface 45. In this case, the band-shaped laser beam 47 illuminates an area elongated in a direction perpendicular to the direction 49 on the wafer surface 45. The wafer surface 45 illuminated with the laser beam 47 generates the scattered light 7, and the image of the wafer surface 45 is formed on the two-dimensional CCD sensor 4 by the scattered light 7.

Figure 6:
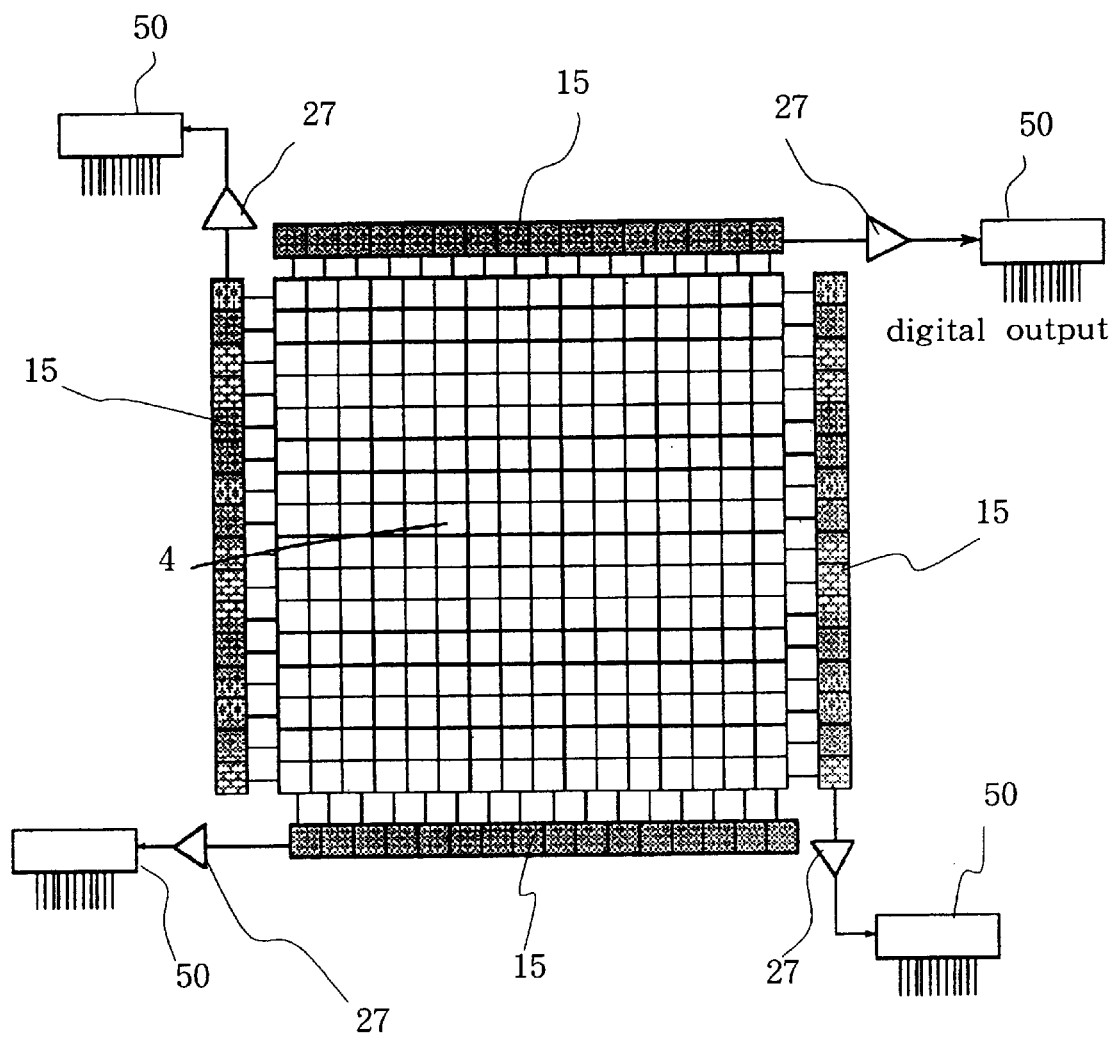
FIG. 6 is a view showing another embodiment of the two-dimensional CCD sensor of the apparatus according to the present invention.

The two-dimensional CCD sensor 4 and the driving circuit 17 may also have a function of shifting the charge signal in a direction perpendicular to the shift direction. FIG. 6 shows the two-dimensional CCD sensor which has a function of shifting the charge signal in a direction perpendicular to the shift direction. Referring to FIG. 6, reference numeral 50 denotes a A/D converter for converting the amplified outputs from the amplifier 27. As shown in FIG. 6, when the charges are shifted perpendicular to a specific shift direction, two or more shift registers 15 are installed beside the CCD sensor 4 for receiving the charge signals of the pixels. The driving means functions to shift charges to the specific shift direction or perpendicular thereto such that the shift speed of the charge signal matches the moving speed of the image on the light receiving surface. With this arrangement, even when the moving direction of the observation target does not match the shift direction of the two-dimensional CCD sensor 4, the still image of the observation target can be obtained by adjusting the shift speed in each shift direction.

As has been described above, according to the present invention, an observation apparatus having a simple arrangement, which can observe a defect of a moving target or semiconductor wafer by using scattered light in real time with a high sensitivity in accordance with the movement of the target object can be provided.

What is claimed is:

1. An observation apparatus for observing semiconductor wafers comprising:
   a CCD sensor which: has, on a light-receiving surface, pixel lines each including a plurality of pixels, sequentially shifts charge signals of the pixels of each line, which are generated upon receiving light, to the adjacent line, and sequentially outputs the charge signals through the line at one end;
   illuminating means for making a laser beam incident into the wafer through the side surface of the wafer along a direction perpendicular to the moving direction and parallel to the surface of the wafer;
   imaging means for focusing scattered light from the wafer to form a band-shaped image elongated in a direction perpendicular to the moving direction of the image on said light-receiving surface; and
   driving means for driving said CCD such that the shift speed of the charge signal matches the moving speed of the image on said light-receiving surface.

2. An apparatus according to claim 1, wherein said CCD sensor and said driving means have a function of shifting the charge signals in a direction perpendicular to the shift direction.

3. An apparatus according to claim 1, wherein said CCD sensor has a shift register for receiving the charge signals of the pixels of said line at one end, shifting the received charge signals to sequentially output each charge signal, and a dark current buffer for storing charge signals of a dark current output to said shift register through said line at one end, and outputs contents obtained by subtracting, from contents of said shift register, corresponding contents of said dark current buffer.

4. An observation apparatus, for observing a fluid from a front surface of a fluid cell in which the fluid flows, comprising:
   a CCD sensor which: has, on a light-receiving surface, pixel lines each including a plurality of pixels, sequentially shifts charge signals of the pixels of each line, which are generated upon receiving light, to the adjacent line, and sequentially outputs the charge signals through the line at one end;
   illuminating means for making a laser beam incident into the fluid through the side surface of the cell along a direction perpendicular to the flowing direction and parallel to the front surface of the cell;
   imaging means for focusing scattered light from the fluid to form a band-shaped image elongated in a direction perpendicular to the moving direction of the image on said light-receiving surface; and
   driving means for driving said CCD such that the shift speed of the charge signal matches the moving speed of the image on said light-receiving surface.

5. An apparatus according to claim 4, wherein said CCD sensor and said driving means have a function of shifting the charge signals in a direction perpendicular to the shift direction.

6. An apparatus according to claim 4, wherein said CCD sensor has a shift register for receiving the charge signals of the pixels of said line at one end, shifting the received charge signals to sequentially output each charge signal, and a dark current buffer for storing charge signals of a dark current output to said shift register through said line at one end, and outputs contents obtained by subtracting, from contents of said shift register, corresponding contents of said dark current buffer.

* * * * *